INVENTOR.
MILAN BOYANICH, SR.
BY
Christel & Bean
ATTORNEYS.

3,526,920
REARVIEW MIRROR WIPER
Milan Boyanich, Sr., 41 Fontaine Drive,
Cheektowaga, N.Y. 14215
Filed Sept. 5, 1968, Ser. No. 777,210
Int. Cl. B60s 1/44
U.S. Cl. 15—250.29               5 Claims

ABSTRACT OF THE DISCLOSURE

An outside-mounted rectangular rearview mirror having a vertical wiping blade with horizontal slots above and below the mirror portion. Drive and transmission means is disposed in a casing behind the mirror and has wiper support members extending through the slots and in engagement with the upper and lower ends of the wiper to reciprocate the latter horizontally across the mirror.

BACKGROUND OF THE INVENTION

This invention relates to wiping means for outside mounted rearview mirrors of the kind used particularly on commercial vehicles.

Wiping mechanisms for rearview mirrors heretofore proposed have been generally of the swinging or rotary blade type which do not render them suitable to efficient wiping of the relatively limited viewing surface of rearview mirrors. Rearview mirrors of the type used widely on commercial vehicles are relatively high compared to their width and this renders the problem of efficiently wiping a substantial surface of the mirror difficult to accomplish by presently available means.

SUMMARY OF THE INVENTION

The present invention provides a wiping mechanism for outside mirrors of the rectangular type wherein the wiper blade extends vertically the full length of the mirror and moves laterally back and forth across virtually the entire surface of the mirror to efficiently wipe the full area thereof.

In the present invention this is accomplished by providing a frame which supports the mirror in such a way that horizontal slots are provided along the upper and lower edges of the mirror through which supporting and driving means for the wiper blade project. A space behind the mirror and within the supporting frame contains transmission means for positively reciprocating the supporting and driving means.

DESCRIPTION OF THE PREFERRED EMBODIMENT

Figures 1, 2:
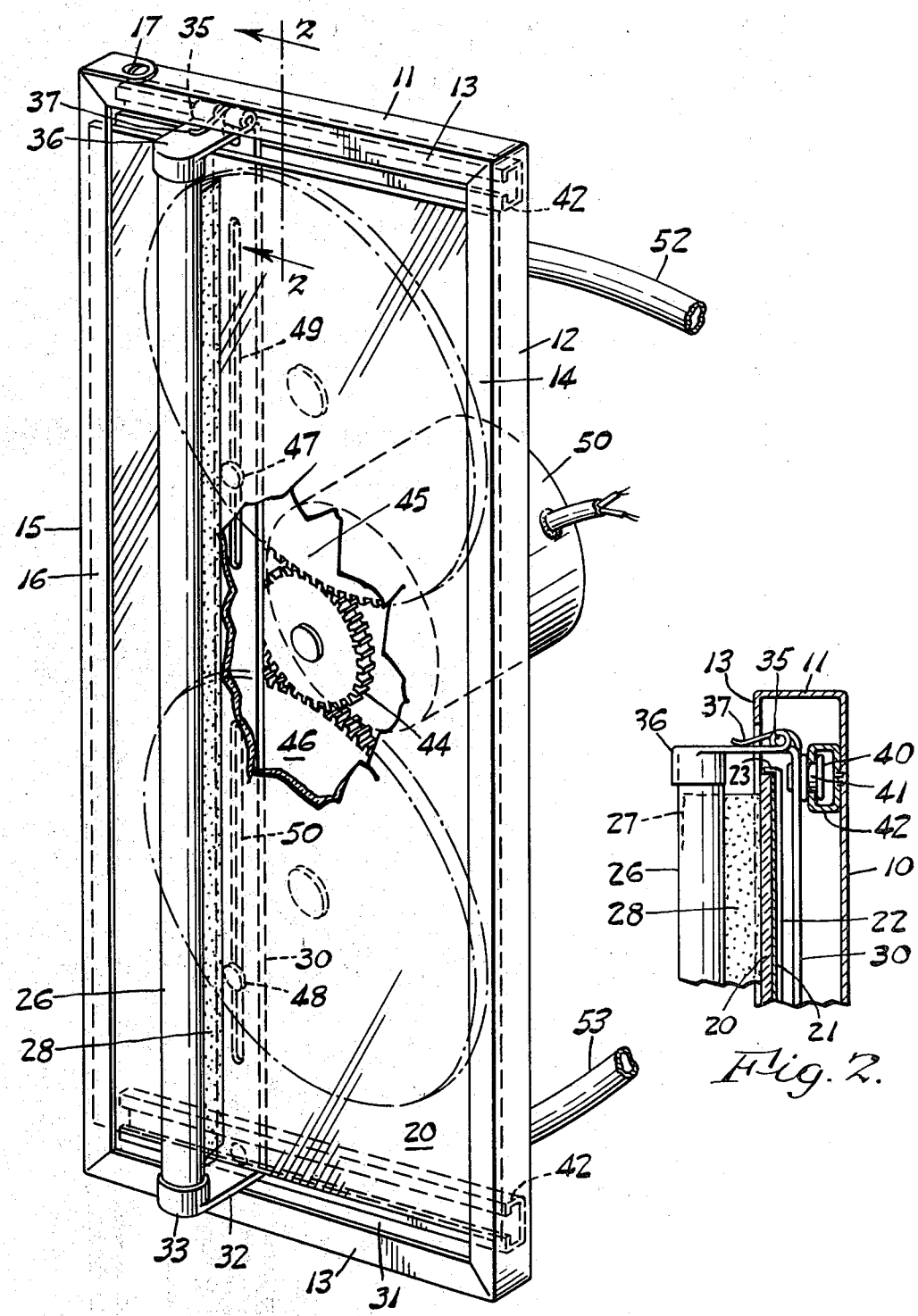
FIG. 1 is a general perspective view of one form of the rearview mirror and wiping means combination of the present invention with a portion of the mirror broken out to further illustrate the drive mechanism.
FIG. 2 is a fragmentary vertical cross-sectional view taken approximately on the line 2—2 of FIG. 1.

As illustrated in the accompanying drawing, the supporting frame for the mirror and wiping mechanism of the present invention comprises a front wall member 10 having top and bottom edge flanges 11 and a side flange 12. The top and bottom flanges 11 have rear flanges 13 and the side flange 12 also terminates in a rear flange 14. A removable angle member 15 at the other side of the support provides side and rear flanges, the latter being designated 16, and is removable by means of upper and lower screws 17 to facilitate removing and replacing the mirror and to give convenient access to the internal mechanism.

The mirror itself is designated 20 and has a usual backing or coating 21 and is contained within vertical side flanges 22 fixed to the side flange 12 and the side flange of angle member 15. These side flanges have their upper and lower ends bent to retain the mirror 20 vertically, as indicated at 23 in FIG. 2.

The wiper member itself includes a cylindrical channel member 26 which has an open slot along its surface facing toward mirror 20 and the wiper comprises a rubber or similar body having a cylindrical portion 27 and a generally wedge-shaped wiping portion 28 projecting therefrom through the slot in cylindrical channel 26.

The wiper assembly is supported from a bar 30 which is disposed within the frame member and extends generally parallel to the wiper member. The lower end of bar 30 extends through a slot 31 at the lower edge of mirror 20, as shown at 32 and terminates in a cup-shaped member 33 which receives the lower end of wiper holder 26. The upper end of bar 30 has a hinge connection 35 with a cup-shaped member 36 which engages the upper end of wiper holder 26 and is normally held in assembled position by a spring member 37. Cup-shaped member 36 may be raised to remove and replace the wiper element and holder.

Bar 30 has fixed thereto adjacent to its upper and lower ends pins 40 which have reduced diameter portions 41 which are engaged by the terminal flanges of box channel members 42 which are fixed to front wall 10 by spot welding or the like. Bar 30 and the wiper assembly are thus supported for horizontal tracking movement.

The drive means for producing this horizontal movement comprises a drive pinion 44 rotatably mounted against front wall 10 within the supporting frame and a pair of meshing drive gears 45 and 46 which are mounted for free rotation against front wall 10. The drive gears 45 and 46 carry shoulder pins 47 and 48, respectively, which engage vertical slots 49 and 50 formed in bar 30. Obviously, upon rotation of pinion 44 and gears 45 and 46, the action of shoulder pins 47 and 48 in slots 49 and 50 will reciprocate the wiper horizontally across the mirror surface.

In the present instance an electric motor 50 mounted exteriorly of the front wall 10 rotates the drive pinion 44 and suitable reducing gearing may be included in the motor housing. Instead of the electric motor 50 a turbine type fluid pressure motor may be employed, or a flexible cable drive from the vehicle proper to the drive pinion 44 may be provided. In the latter case a common drive means for a pair of oppositely mounted rearview mirrors and wiping mechanisms may be employed.

In FIG. 1 the numerals 52 and 53 designate brackets for supporting the rearview mirror but it is to be understood that this support forms no part of the present invention and any of the usual supporting bracket arrangements may be employed.

In certain rearview mirrors of this general type a bottom section of a convex converging type mirror is provided and obviously the wiper assembly of the present invention may be modified to provide portions for wiping both the principal flat mirror section and such convex lower section.

In certain rearview mirrors the configuration is more nearly square than in the conventional mirror illustrated herein. In such cases a single gear drive for reciprocating the bar 30 may be employed in place of the present combination of a drive pinion and two meshing gears.

A preferred embodiment of this invention having been hereinabove described and illustrated in the drawings, it is to be understood that numerous modifications thereof can be made without departing from the broad spirit and scope of this invention as defined in the appended claims.

I claim:
1. In combination, a rearview mirror and wiper means therefor comprising framing means and a generally rectangular mirror carried thereby, said framing means providing parallel slots along two opposite edges of said mirror, a pair of wiper supports projecting through said slots and a wiper member engaged at its opposite ends by said support and bearing against the face of said mirror, and drive means carried by said framing means at the reverse side of said mirror and adapted to reciprocate said supports synchronously in said slots to cause said wiper member to traverse said mirror face, said drive means comprising a bar connecting between said wiper supports, a rotatably mounted drive member, and eccentric means carried by said drive member and having longitudinal sliding engagement with said bar to reciprocate the same upon rotation of said drive member.

2. The combination according to claim 1 wherein said bar member is longitudinally slotted and said rotatably mounted drive member comprises a gear, and wherein said eccentric means engages the slot in said bar to reciprocate the same.

3. In combination, a rearview mirror and wiper means therefor comprising framing means and a generally rectangular mirror carried thereby, said framing means providing parallel slots along two opposite edges of said mirror, a pair of wiper supports projecting through said slots and a wiper member engaged at its opposite ends by said support and bearing against the face of said mirror, and drive means carried by said framing means at the reverse side of said mirror and adapted to reciprocate said supports synchronously in said slots to cause said wiper member to traverse said mirror face, said drive means comprising a longitudinally slotted bar connecting between said wiper supports, a drive pinion, and a pair of gears spaced in the direction of extent of said slotted bar and adapted to be rotated by said drive pinion, and eccentric means carried by said gears and engaging said slotted bar at spaced points therealong for reciprocating the same transversely upon rotation of said drive pinion.

4. The combination according to claim 1 wherein said framing means includes guide formations parallel to said slots and said bar includes means engaging said guide formations during reciprocation of said bar.

5. The combination according to claim 3 wherein said framing means includes guide formations parallel to said slots and said slotted bar includes means engaging said guide formations during reciprocation of said slotted bar.

References Cited

UNITED STATES PATENTS

| | | | |
|---|---|---|---|
| 2,814,823 | 12/1957 | Werner | 15—250.22 |
| 3,320,627 | 5/1967 | Engel | 15—250.29 |
| 3,354,494 | 11/1967 | Rischman | 15—250.24 |

ROBERT W. MICHELL, Primary Examiner